(12) United States Patent
Matsuoka (10) Patent No.: US 9,607,253 B2
(45) Date of Patent: Mar. 28, 2017

(54) PRINTING APPARATUS AND PRINT CONTROL METHOD

(71) Applicant: CANON KABUSHIKI KAISHA, Tokyo (JP)

(72) Inventor: Hitoshi Matsuoka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/091,873

(22) Filed: Apr. 6, 2016

(65) Prior Publication Data

US 2016/0314385 A1 Oct. 27, 2016

(30) Foreign Application Priority Data

Apr. 21, 2015 (JP) ................................. 2015-087071

(51) Int. Cl.
| | | |
|---|---|---|
| *B41J 2/15* | (2006.01) | |
| *G06K 15/02* | (2006.01) | |
| *H04N 1/40* | (2006.01) | |
| *H04N 1/00* | (2006.01) | |
| *H04N 1/034* | (2006.01) | |
| *H04N 1/23* | (2006.01) | |
| *G06K 15/10* | (2006.01) | |
| *B41J 2/045* | (2006.01) | |

(52) U.S. Cl.
CPC ...... *G06K 15/1894* (2013.01); *B41J 2/04573* (2013.01); *B41J 2/04586* (2013.01); *G06K 15/102* (2013.01); *H04N 1/00933* (2013.01); *H04N 1/034* (2013.01); *H04N 1/2346* (2013.01); *H04N 1/40025* (2013.01); *H04N 1/40056* (2013.01); *H04N 2201/0094* (2013.01)

(58) Field of Classification Search
CPC . B41J 2/04588; B41J 2/04541; B41J 2/04573
See application file for complete search history.

(56) References Cited

U.S. PATENT DOCUMENTS

| | | | | |
|---|---|---|---|---|
| 7,578,568 B2* | 8/2009 | Usui | ............... | B41J 2/04581 347/11 |
| 8,308,260 B2* | 11/2012 | Kaneko | ............... | B41J 2/04581 347/11 |
| 8,944,551 B2* | 2/2015 | Otsuka | ............... | B41J 2/04588 347/11 |

FOREIGN PATENT DOCUMENTS

JP 2000-025228 A 1/2000

* cited by examiner

*Primary Examiner* — Lamson Nguyen
(74) *Attorney, Agent, or Firm* — Fitzpatrick, Cella, Harper & Scinto (57) ABSTRACT

A printing apparatus inputs print data, generates a driving pulse to cause a plurality of print elements of a printhead to perform a printing operation and generates a print data signal based on the input print data to cause the printhead to print on a print medium. At this time, for example, the signal generation timing is controlled so as to determine, based on a driving pulse width, a generation range of the print data signal so as not to overlap with the leading edge and the trailing edge of the driving pulse. Subsequently, the generated driving pulse and the generated print data signal are transferred to the printhead, and the printhead is driven to print on the print medium.

20 Claims, 9 Drawing Sheets

P1: PULSE WIDTH DETERMINED BY
HEAT PULSE WIDTH DETERMINATION UNIT

FIG. 4B

P1: PULSE WIDTH DETERMINED BY
HEAT PULSE WIDTH DETERMINATION UNIT

PRINTING APPARATUS AND PRINT CONTROL METHOD

BACKGROUND OF THE INVENTION

Field of the Invention

The present invention relates to a printing apparatus and a print control method, and particularly to, for example, a printing apparatus that prints an image on a print medium using inkjet printheads and a print control method thereof.

Description of the Related Art

In recent years, an inkjet printing apparatus (to be referred to as a "printing apparatus" hereinafter) that prints an image by heating a plurality of print elements provided in each printhead to discharge ink droplets on a print medium such as printing paper or the like and causing the ink droplets to adhere to the print medium to form dots has become popular.

The driving operation of printheads that print by discharging ink has been performed in a conventional printing apparatus in the following manner.

Figure 8:
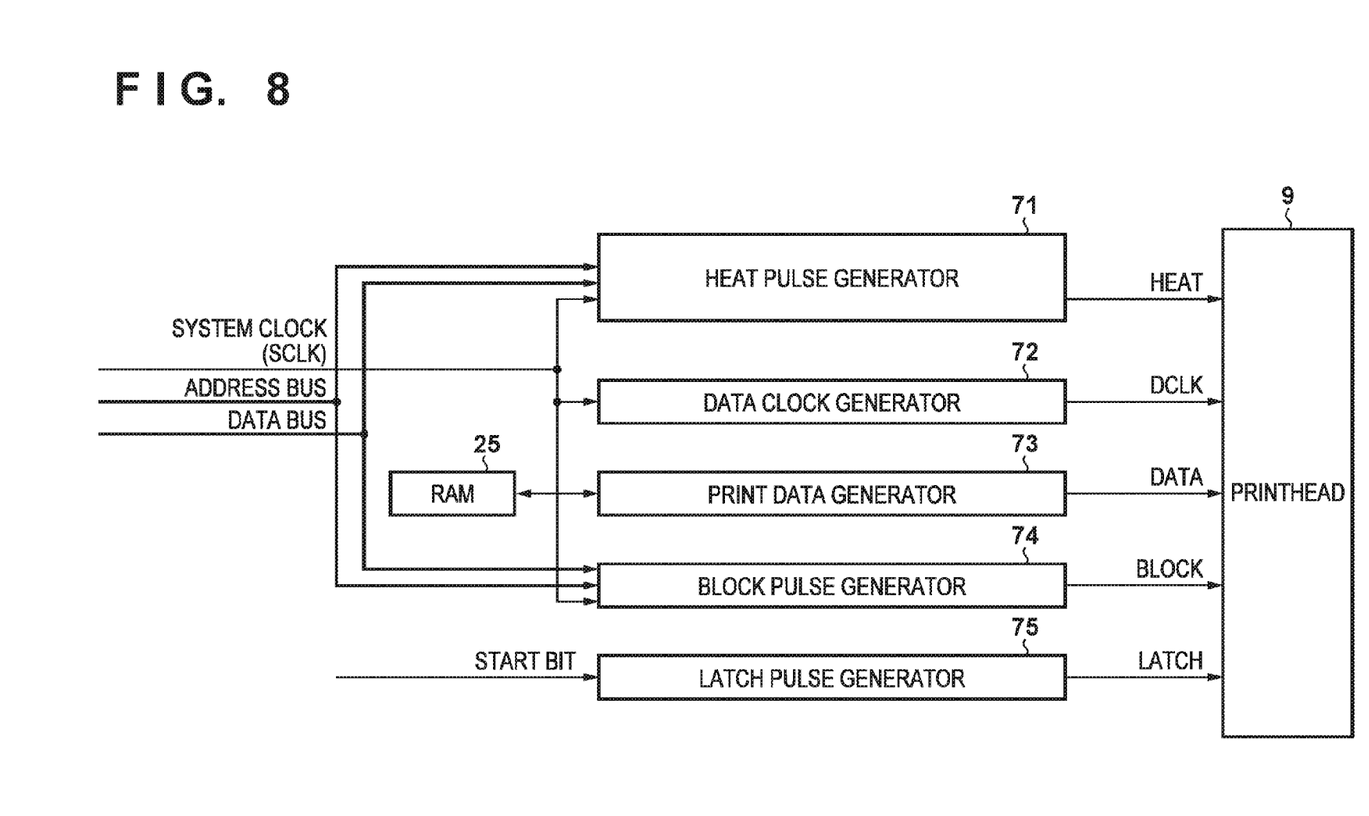
FIG. 8 is a block diagram showing the arrangement of a conventional printhead control circuit.

FIG. 8 is a block diagram showing the arrangement of a printhead drive control circuit for driving printheads.

As shown in FIG. 8, a system clock (SCLK) is supplied to a heat pulse generator 71, a print data generator 73, and a block pulse generator 74. In addition, pulse setting information (to be described later) is supplied from a CPU (not shown) to the heat pulse generator 71 via a data bus and an address bus. Based on the control by the CPU, print data is supplied from a RAM 25 to the print data generator 73 and a start bit (START) instructing the start of printing is supplied to a latch pulse generator 75.

When the start bit is supplied, the latch pulse generator 75 supplies a latch pulse (LATCH) to a driving circuit of printheads 9. Furthermore, in synchronization with the system clock (SCLK), the heat pulse generator 71, the print data generator 73, and the block pulse generator 74 generate a heat pulse (HEAT), a print data signal (DATA), and a block pulse (BLOCK), respectively.

Figure 9:
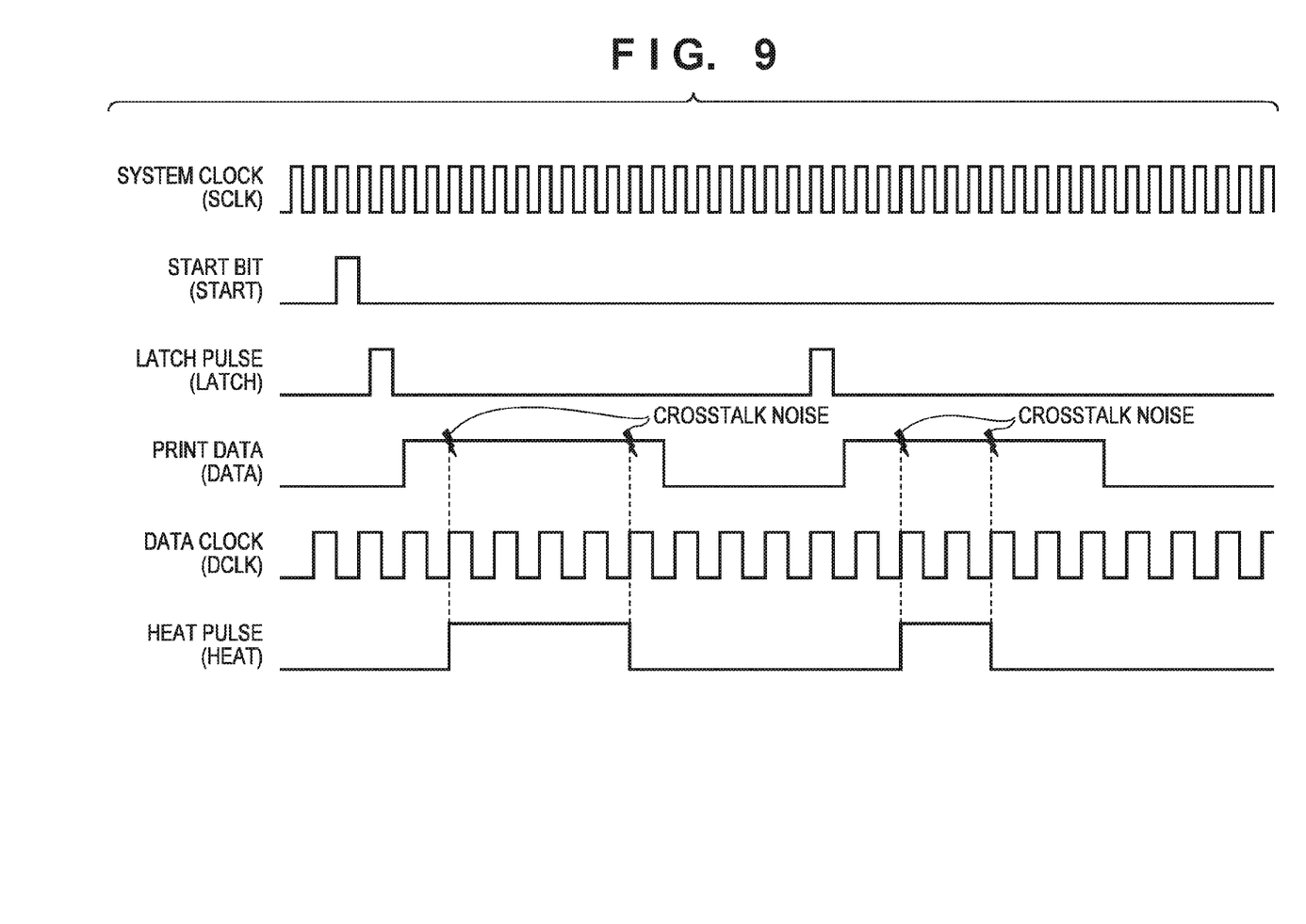
FIG. 9 is a timing chart of each signal of the printhead control circuit shown in FIG. 8.

FIG. 9 is a timing chart of each signal of the printhead drive control circuit shown in FIG. 8.

The reciprocal of a period between two latch pulses (LATCH) is the print frequency, and ink is discharged from all the nozzles provided in the printhead 9 during this period. For example, 60 nozzles are divided into 6 ten-nozzle blocks in accordance with the block pulse (BLOCK) by a multiplexer provided in the printhead 9, and the nozzles belonging to each block are sequentially selected and driven.

Note that the pulse setting information is changed by the internal temperature of the printhead 9 and variations in heating characteristics of the heaters which are in the nozzles and used for ink discharge. This temperature information is transferred to the CPU via an A/D conversion circuit by a signal from a temperature sensor provided in the printhead. The CPU adjusts the value according to the transferred temperature information so that an appropriate heat pulse (HEAT) which is in accordance with the internal temperature of each printhead can be obtained.

However, according to the above-described conventional print head driving control, the timings of the leading edge and the trailing edge of the heat pulse are uncertain since each pulse width of the heat pulse (HEAT) changes depending on the internal temperature of the printhead.

In recent years, along with the increase in the number of nozzles provided in each printhead, the heat current that flows at the generation time of a heat pulse has increased and crosstalk occurring at the leading edge and the trailing edge of the heat current has become problematic. As shown in FIG. 9, crosstalk noise can be superimposed on the print data signal (DATA) at the timings of the leading edge and the trailing edge of the heat pulse (HEAT) in some cases.

A technique disclosed in Japanese Patent Laid-Open No. 2000-25228 considers the influence of crosstalk noise to a data clock (DCLK). More specifically, the technique adjusts the timings so that the leading edge and the trailing edge of the heat pulse (HEAT) will not overlap with the leading edge and the trailing edge of the data clock (DCLK) by delaying the data clock signal by one clock.

However, since the objective of the technique disclosed in Japanese Patent Laid-Open No. 2000-25228 is to prevent a case in which the print data signal (DATA) cannot be sampled at the point of change of the data clock (DCLK), it cannot prevent the influence of crosstalk noise on the print data signal (DATA) itself. Furthermore, since the data clock (DCLK) needs to be temporarily stopped, it is difficult to directly apply the technique proposed in Japanese Patent Laid-Open No. 2000-25228 to a case where data communication between the main body of the printing apparatus and the printheads is serial communication.

As an influence of crosstalk noise on the print data signal (DATA), there is the influence of waveform distortion in which the voltage amplitude temporarily changes. Particularly, in the case of LVDS (Low Voltage Differential Signaling) or the like, the distortion amount of the amplitude becomes large since the voltage amplitude is small, thereby increasing the possibility that a receiver may not be able to receive a signal normally. Typically, since LVDS uses a differential signal, LVDS has a high tolerability to common noise but has a low tolerability to differential noise.

In addition, to meet the recent demand for higher printing speed, the number of nozzles provided in each printhead is increasing. This increase in the number of nozzles leads to an increase in the total heat current necessary for ink discharge. The increase in the number of nozzles also requires an increase in the transfer speed of the print data signal that causes ink discharge from the nozzles. An increase in the heat current linearly increases the amount of crosstalk noise, and higher print data transfer speed increases the probability of receiving the influence of crosstalk noise.

SUMMARY OF THE INVENTION

Accordingly, the present invention is conceived as a response to the above-described disadvantages of the conventional art.

For example, a printing apparatus and a print control method according to this invention are capable of avoiding the influence of crosstalk noise.

According to one aspect of the present invention, there is provided a printing apparatus that prints on a print medium by using a printhead including a plurality of print elements, comprising: an input unit configured to input print data; a first generation unit configured to generate a driving pulse to cause the plurality of print elements to perform a printing operation; a second generation unit configured to generate a print data signal based on the print data input by the input unit to cause the printhead to print on the print medium; a control unit configured to control a signal generation timing in one of the first generation unit and the second generation unit so as to determine, based on a driving pulse width, a generation range of the print data signal so as not to overlap with a leading edge and a trailing edge of the driving pulse or determine, based on the generation range of the print data signal, the driving pulse width so that the leading edge and the trailing edge of the driving pulse do not overlap with the generation range of the print data signal; and a print unit configured to transfer the driving pulse generated by the first generation unit and the print data signal generated by the second generation unit to the printhead and drive the printhead to print on the print medium.

According to another aspect of the present invention, there is provided a print control method of a printing apparatus that prints on a print medium by using a printhead including a plurality of print elements, comprising: inputting print data; generating a driving pulse to cause the plurality of print elements to perform a printing operation; generating a print data signal based on the input print data to cause the printhead to print on the print medium; controlling one of a generation timing of the driving pulse and a generation timing of the print data signal so as to determine, based on a driving pulse width, a generation range of the print data signal so as not to overlap with a leading edge and a trailing edge of the driving pulse or determine, based on the generation range of the print data signal, the driving pulse width so that the leading edge and the trailing edge of the driving pulse do not overlap with the generation range of the print data signal; and transferring the generated driving pulse and the generated print data signal to the printhead and driving the printhead to print on the print medium.

The invention is particularly advantageous since upon generating a print data signal to be transferred to a printhead, signal generation can be controlled so that leading edges and trailing edges of the print data signal and a heat pulse will not overlap with each other. This can prevent mixing of crosstalk noise into the print data signal due to the heat pulse, thereby preventing the occurrence of printing operation failure and achieving high quality image printing.

In addition, since there is no need to take a special crosstalk measure as, for example, separating the paths of the heat pulse signal line and the print data signal line, it also contributes to reducing the cost of the printing apparatus.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similarly to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element" (to be also referred to as "nozzle") generically means an ink orifice or a liquid channel communicating with it, and an element for generating energy used to discharge ink, unless otherwise specified.

An element substrate (head substrate) for a printhead to be used below indicates not a mere base made of silicon semiconductor but a component provided with elements, wirings, and the like.

"On the substrate" not only simply indicates above the element substrate but also indicates the surface of the element substrate and the inner side of the element substrate near the surface. In the present invention, "built-in" is a term not indicating simply arranging separate elements on the substrate surface as separate members but indicating integrally forming and manufacturing the respective elements on the element substrate in, for example, a semiconductor circuit manufacturing process.

Figure 1:
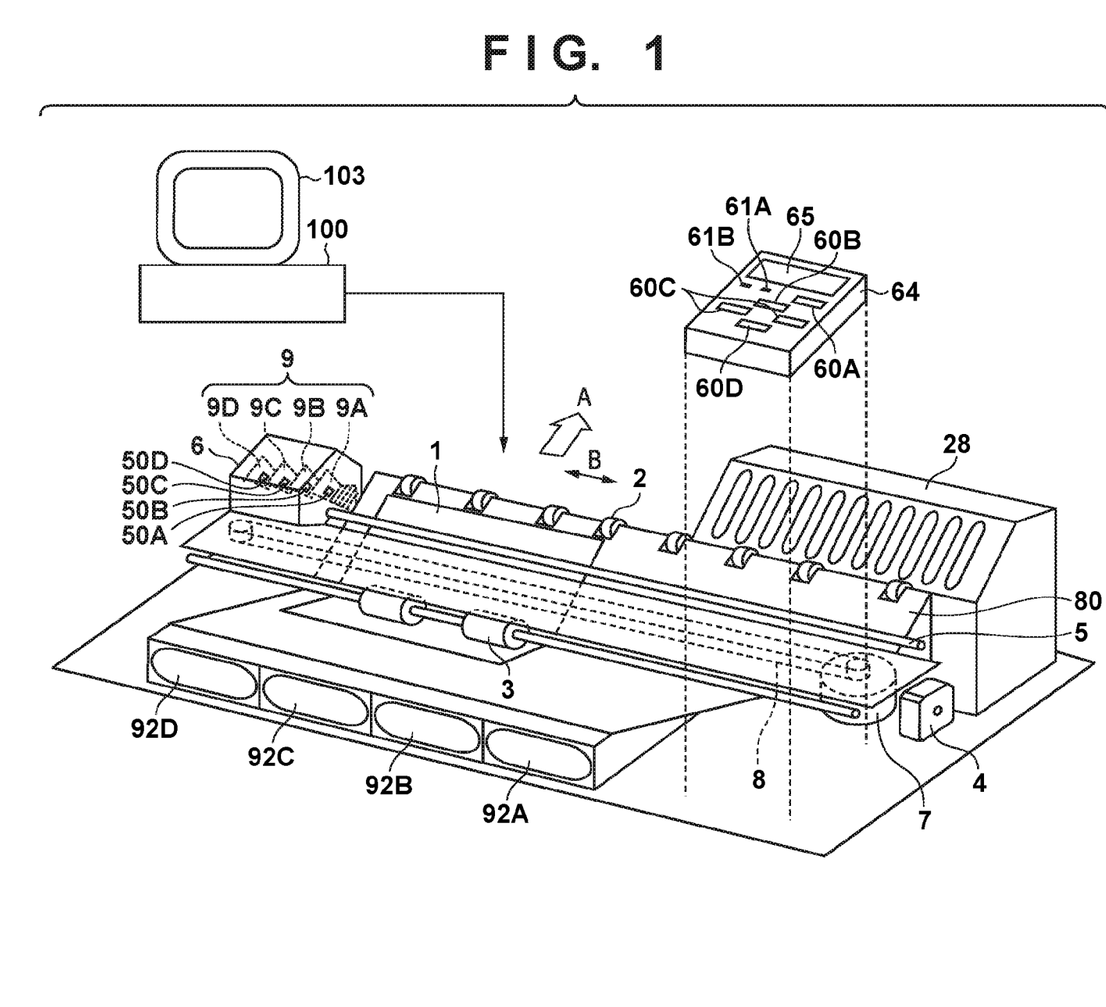
FIG. 1 is a perspective view showing the schematic outer appearance of an inkjet printing apparatus according to a representative embodiment of the present invention.
Figure 2:
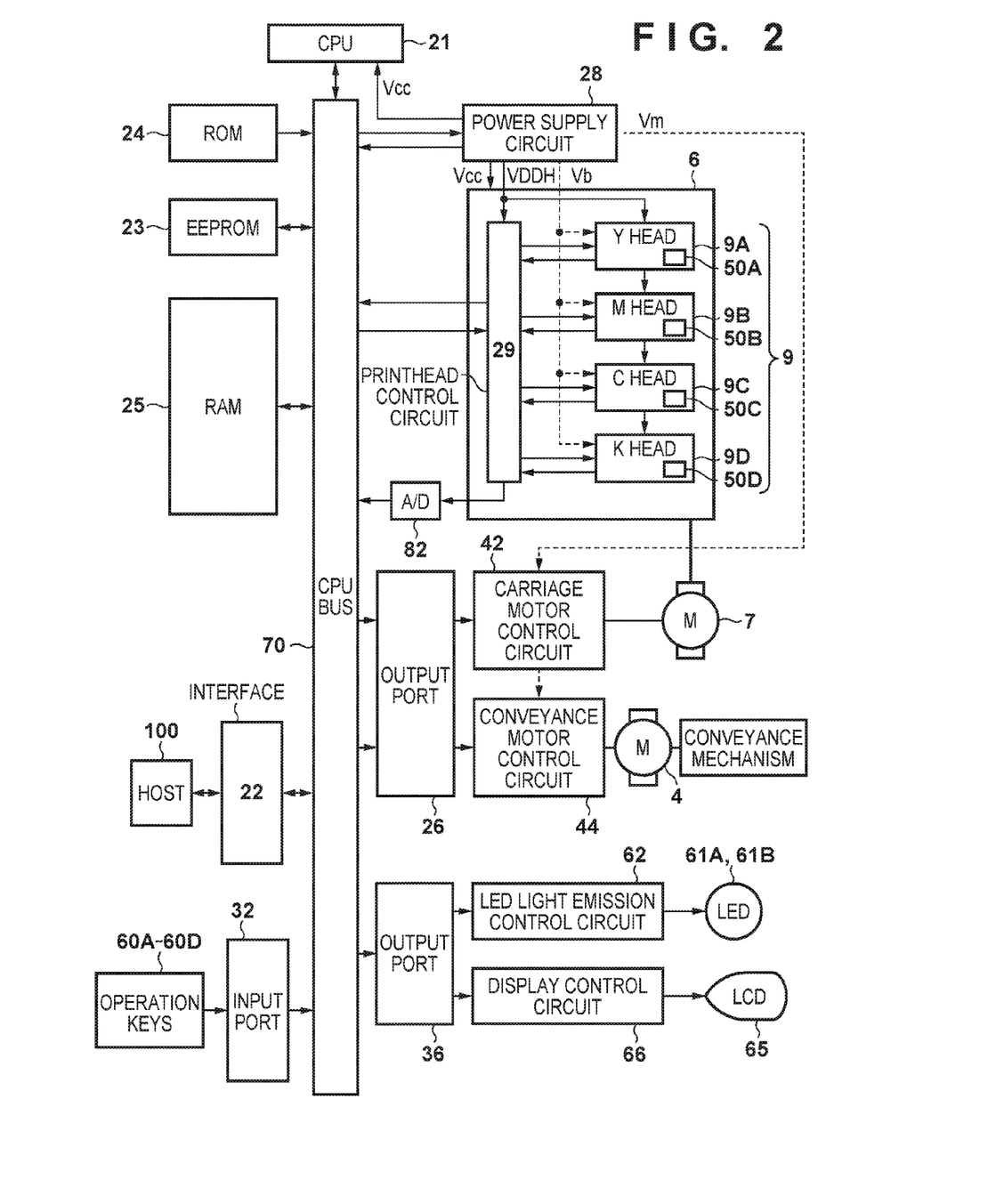
FIG. 2 is a block diagram showing the control arrangement of the inkjet printing apparatus shown in FIG. 1.

<Overview of Printing Apparatus (FIGS. 1 and 2)

FIG. 1 is a perspective view showing the schematic outer appearance of a printing apparatus that performs printing by using inkjet printheads (to be referred to as "printheads" hereinafter) according to an exemplary embodiment of the present invention.

FIG. 1 shows a print medium 1, conveyance rollers 2 and 3 which are arranged on the top and bottom, respectively, of a printing region of the print medium 1 and convey the print medium 1 in the direction indicated by an arrow A, and a conveyance motor 4 which drives the conveyance rollers 2 and 3. Guide shafts 5 are provided in parallel to the respective rotation axes of the conveyance rollers 2 and 3 and positioned in between the conveyance rollers 2 and 3. A carriage 6 reciprocally moves (in directions indicated by an arrow B) along the guide shafts 5. A carriage motor 7 moves the carriage. Additionally, a belt 8 transmits the driving force of the carriage motor 7 to the carriage 6.

Printheads 9A to 9D (when these four printheads are to be generically mentioned, they will be referred to as "printheads 9" hereinafter) that perform printing by discharging ink droplets according to the inkjet method are mounted in the carriage 6. The printheads 9 are for printing a color image, and the four printheads are arranged in the moving direction of the carriage 6. That is, four printheads constituted by the printhead (Y head) 9A, the printhead (M head) 9B, printhead (C head) 9C, and printhead (K head) 9D corresponding to the respective color inks yellow (Y), magenta (M), cyan (C), and black (K) are arranged in the arrow B direction. The front face of each printhead 9A, 9B, 9C, or 9D, that is, each surface facing the printing surface of the print medium 1 with a predetermined spacing (for example, 0.8 mm) has a plurality of (for example, 60) nozzles arranged in a single line in a direction perpendicular (that is, the conveyance direction (arrow A direction) of the print medium 1) to the scanning direction of the carriage 6. The logic circuits of the printheads 9A to 9D have the same arrangement.

An online/offline switching key 60A, a line feed key 60B, a print mode switching key 60C, a reset key 60D, and the like are provided on an operation panel 64 that is to be attached to an exterior case (not shown) of the printing apparatus. In addition, LED lamps serving as warning lamps such as an alarm lamp 61A and a power lamp 61B and an LCD 65 that displays various messages are provided on the operation panel 64.

Note that, reference numeral 80 denotes a platen and reference numeral 92 denotes an ink tank that stores ink for printing a desired image on the print medium 1. The ink tank 92 is formed from four ink compartments 92A to 92D storing the four colors (yellow (Y), magenta (M), cyan (C), and black (K)) of inks in correspondence with the printheads 9A to 9D. As a matter of course, the ink tank 92 not only can be arranged as a component separate from the printheads 9 as shown in FIG. 1 but can also be arranged by using a component such as an ink cartridge integrating the ink tank and the printhead.

Although details will be described later, a control unit including a CPU of the printing apparatus and a ROM and RAM arranged together with the CPU receives an instruction signal and print data (print information) from a host computer 100 (to be referred to as a "host" hereinafter) which includes a display 103. Then, based on the instruction signal and print data, the control unit drives the various motors and the like and applies a driving power supply voltage (heat power supply voltage) to energize an electrothermal transducer (heater) included in each printhead 9A, 9B, 9C, or 9D.

FIG. 2 is a block diagram showing the control arrangement of the printing apparatus shown in FIG. 1.

As shown in FIG. 2, the printing apparatus is connected to the host 100 via an interface 22 and receives an instruction signal (command) and print information from the host 100 via the interface 22. A CPU 21 accesses a ROM 24 storing a control program and an EEPROM 23 storing an updatable control program, a processing program, various kinds of constant data, and the like and executes print control based on information stored in these memories. When performing print control, the CPU 21 also accesses a RAM 25 for storing the instruction signal (command) and print information received from the host 100 and controls the actual printing operation based on these pieces of information.

Further, the CPU 21 moves the carriage 6 by causing the carriage motor 7 to operate via an output port 26 and a carriage motor control circuit 42. Furthermore, the CPU 21 causes the conveyance mechanisms such as the conveyance rollers 2 and 3 to operate by causing the conveyance motor 4 to operate via the output port 26 and a conveyance motor control circuit 44. Furthermore, the CPU 21 prints a desired image on the print medium 1 by driving the printheads 9A to 9D via a printhead control circuit 29 based on print information stored in the RAM 25.

A logic driving voltage Vcc (for example, 5 V) for operating the CPU 21 and the printhead control circuit 29, various motor driving voltages Vm (for example, 30 V), and a heat voltage Vh (for example, 25 V) for driving the printheads 9 are output from a power supply circuit 28. A backup voltage VDDH and the like for protecting the printheads 9 are also output from the power supply circuit 28. The heat voltage Vh is applied to the printheads 9 and the backup voltage VDDH is applied to printhead control circuit 29 and the printheads 9.

Instructions input from the operation keys 60A to 60D are transmitted to the CPU 21 via an input port 32, and commands from the CPU 21 are transmitted to an LED light emission control circuit 62 and a display control circuit 66 via an output port 36. Accordingly, the LED lamps 61A and 61B are turned on or a message is displayed on the LCD 65.

Pieces of temperature information (analog signals) output from diode sensors 50A to 50D provided inside the respective printheads 9A to 9D are input to an A/D conversion circuit 82 via the printhead control circuit 29 and converted into digital data. This digital data is transferred to the CPU 21 via a CPU bus 70.

Note that the CPU bus 70 is used for connecting the above-described components with each other and constituted by an address bus and a data bus.

Next, an embodiment in which the influence of crosstalk noise is suppressed by performing control so that the leading edges and trailing edges of a print data signal (DATA) and a heat pulse do not overlap will be described by using the printing apparatus of the above arrangement. Note that although the driving signal of each printhead is called a heat pulse (HEAT) since the above-described printhead is configured to perform printing by driving each electrothermal transducer (heater), it can be generically referred to as a driving pulse.

First Embodiment

Figure 3:
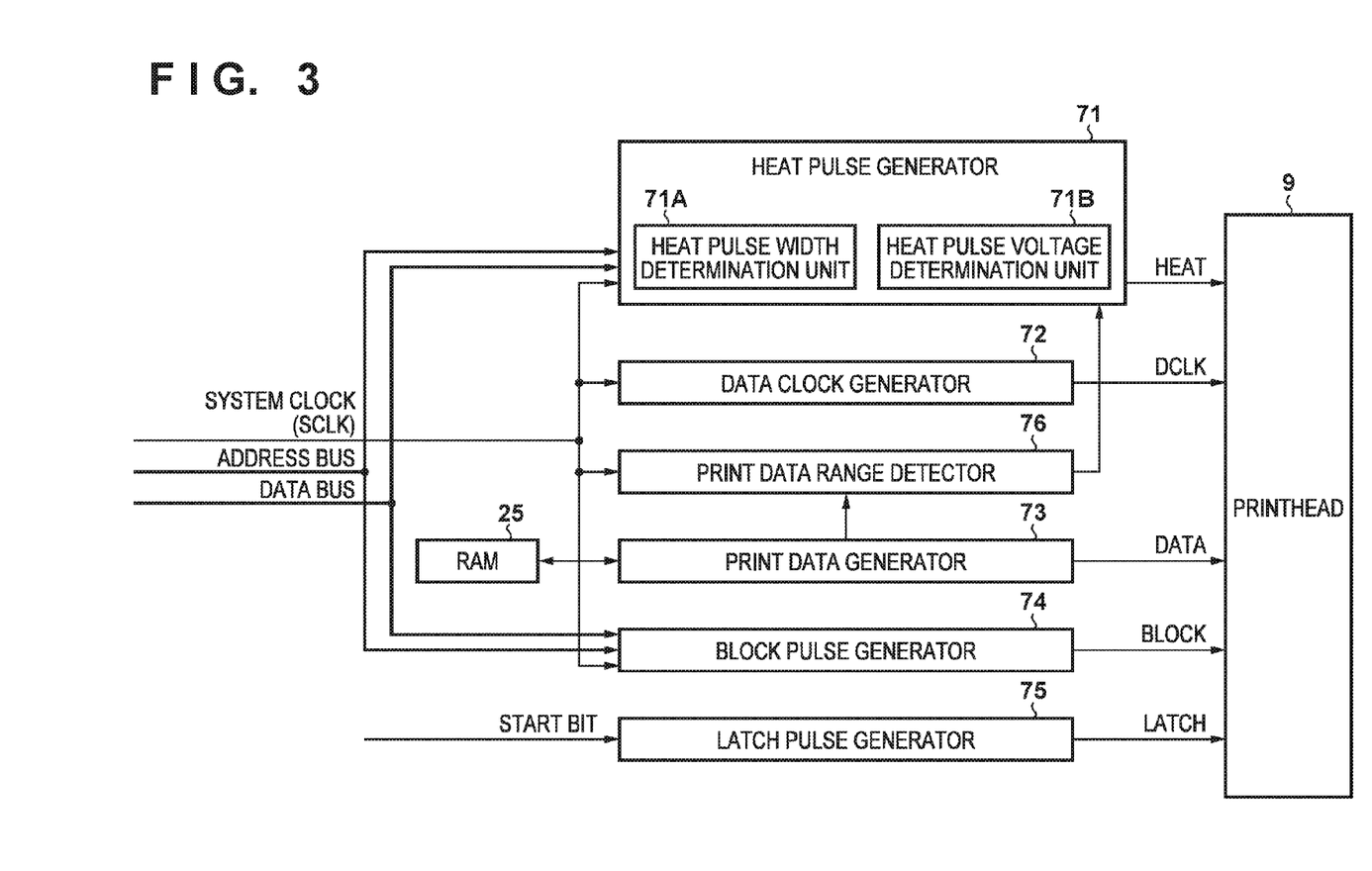
FIG. 3 is a block diagram showing the arrangement of a printhead control circuit according to the first embodiment of the present invention.

FIG. 3 is a block diagram showing the arrangement of a printhead control circuit 29 according to the first embodiment.

Note that in FIG. 3, components and signals already described with reference to FIG. 8 will be mentioned using the same reference numbers and symbols, and a description thereof will be omitted. Only features unique to the first embodiment will be explained.

A CPU 21 transfers, via an address bus and a data bus, pulse setting information to a heat pulse generator 71 based on pieces of temperature information measured and obtained by the diode sensors 50A to 50D provided inside the respective printheads 9. The pulse setting information is information that is changed by the internal temperature of each printhead 9 and the variation in the heating characteristics of each electrothermal transducer (heater) that is provided in each nozzle of each printhead and used for discharging ink. The printing characteristics of the printheads can change due to the internal temperatures of the printheads. Hence, to cause the printheads to stably discharge ink even with this change, it is necessary to change the energy supplied to the electrothermal transducers. Therefore, in the printing apparatus, the width and the voltage value of the heat pulse used for driving the printhead are changed based on the above-described temperature information. Pulse setting information is used to make this change and to select an appropriate heat pulse.

A print data signal (DATA) is supplied from a RAM 25 to a print data generator 73 by the control of the CPU 21. The print data signal (DATA) generated by the print data generator 73 is transferred to a print data range detector 76. The print data range detector 76 detects the one block width of a time-divisional drive printing operation by the print data signal (DATA) and a generation timing of the print data signal and transfers the detected print data range information to the heat pulse generator 71.

In addition, when a start bit (START) that instructs the start of printing is supplied to a latch pulse generator 75, the latch pulse generator 75 supplies a latch pulse (LATCH) to each printhead 9. The latch pulse generator 75 synchronizes with a system clock (SCLK) and transfers the following various types of signals to each printhead 9.

That is, a heat pulse (HEAT), the print data signal (DATA), and a block pulse (BLOCK) are generated by the heat pulse generator 71, the print data generator 73, and a block pulse generator 74, respectively. The generated signals are transferred to each printhead 9. The block pulse (BLOCK) generated by the block pulse generator 74 is converted, by a multiplexer (not shown) in each printhead 9, into a signal that instructs each of a plurality of blocks to perform time-divisional drive, and nozzles belonging to each block are sequentially selected and driven.

The heat pulse generator 71 is formed from a heat pulse width determination unit 71A and a heat pulse voltage determination unit 71B as shown in FIG. 3.

The heat pulse width determination unit 71A determines each width of the heat pulse (HEAT) based on the one block width of a time-divisional drive printing operation by the print data signal (DATA) and the generation timing of the print data signal detected by the print data range detector 76. That is, the heat pulse width determination unit 71A determines each width of the heat pulse (HEAT) so that the width of the heat pulse becomes larger than the pulse width of a print data signal in one block of time-divisional drive operation. In other words, the heat pulse width determination unit 71A determines the width of the heat pulse (HEAT) so that the leading edge and the trailing edge of each heat pulse (HEAT) do not overlap with those of each print data signal (DATA).

The heat pulse voltage determination unit 71B determines a heat voltage value so that constant energy is always applied to the electrothermal transducers (heaters) based on the heat pulse width information determined in the heat pulse width determination unit 71A and the pulse setting information transferred from the CPU 21. The selection of the heat voltage in the heat pulse voltage determination unit 71B is performed by, for example, switching over to an appropriate voltage out of a pre-generated plurality of voltages by a switch or the like.

In other words, in the first embodiment, the signal width of the heat pulse is determined by using the generation range of the print data signal as a reference.

Figure 4A:
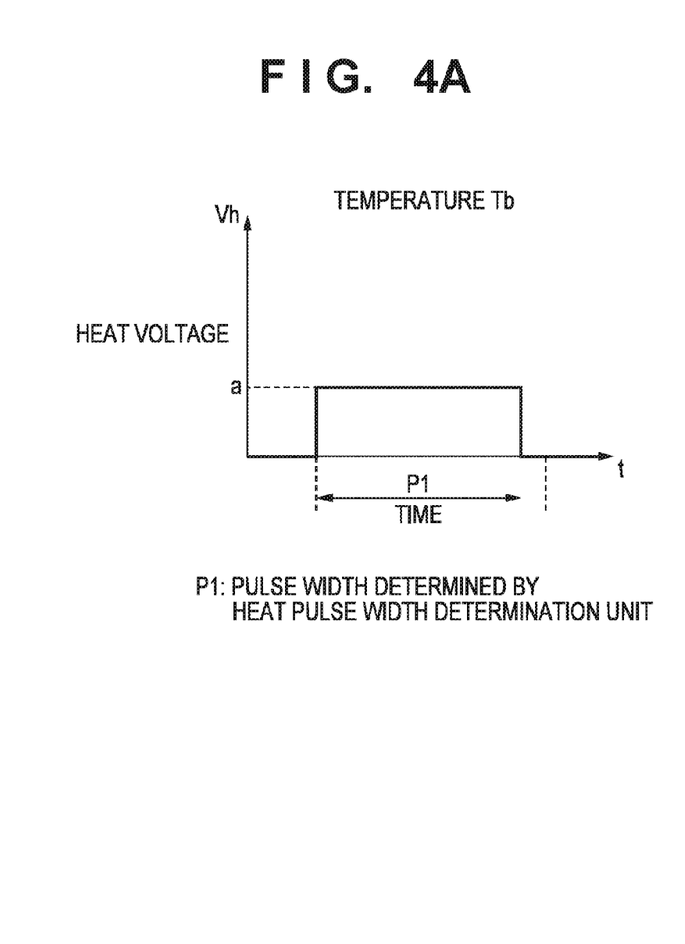
FIGS. 4A and 4B are views showing an example of a heat pulse signal that is determined by a heat pulse width determination unit and a heat pulse voltage determination unit.
Figure 4B:
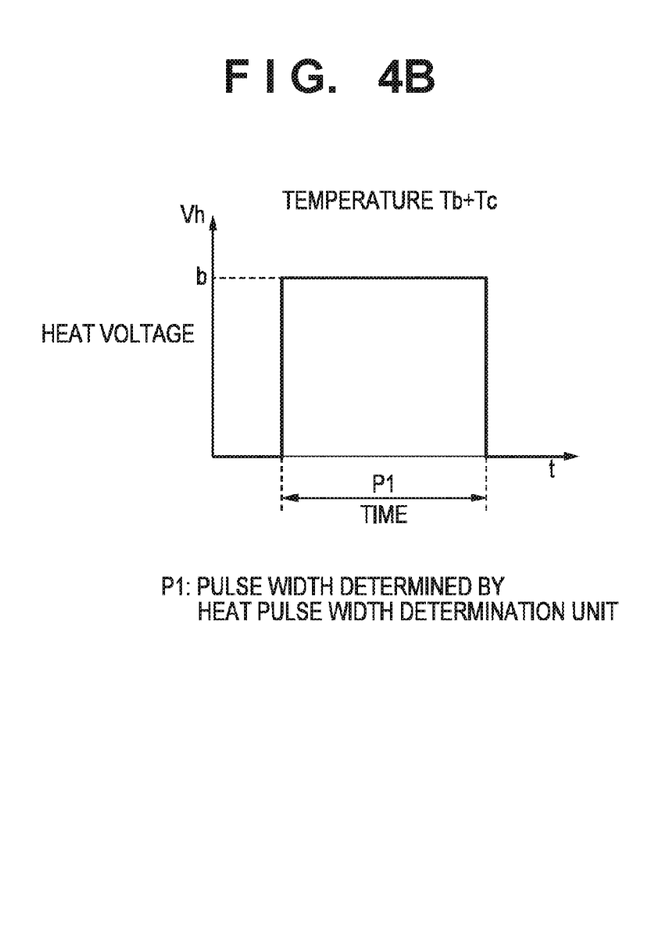

FIGS. 4A and 4B are views each showing an example of the pulse width and the voltage of the heat pulse determined by the heat pulse width determination unit 71A and the heat pulse voltage determination unit 71B, respectively.

As shown in FIG. 4B, when an internal temperature (T) of each printhead changes from Tb to Tb+Tc in a time P1 determined by the heat pulse width determination unit 71A, the heat voltage Vh switches over from a to b so that constant energy will be applied to the corresponding electrothermal transducer (heater).

Figure 5:
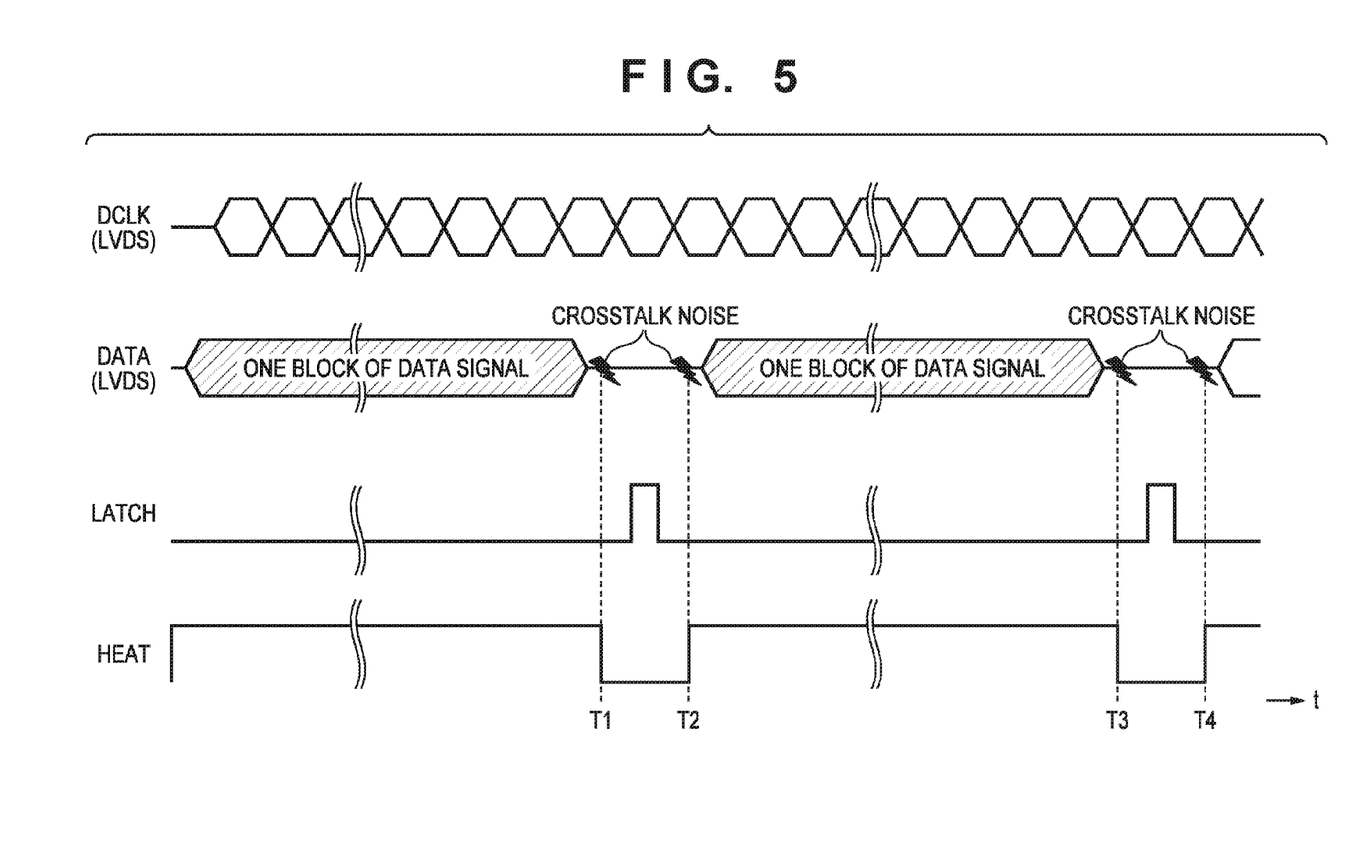
FIG. 5 is a timing chart of each signal of the printhead control circuit shown in FIG. 3.

FIG. 5 is a timing chart showing each signal of the printhead control circuit 29 according to the first embodiment.

As shown in FIG. 5, in the first embodiment, by using the LVDS method for transferring a data clock signal (DCLK) and the print data signal (DATA) of the printheads, high-speed signal transfer and reduction of the number of terminals of the printheads are made possible. In addition, the latch pulse (LATCH) for holding the print data signal (DATA) of each block is generated. As shown in FIG. 5, signal transfer control is performed so that the timings of the leading edge and the trailing edge of the heat pulse (HEAT) do not overlap with the range of the print data signal (DATA).

Hence, even if the crosstalk noise occurring at timings (t=T1, T2, T3, T4) of the leading edges and the trailing edges of the heat pulse (HEAT) is superimposed on the signal line of the print data signal, there is no print data signal at these timings. Accordingly, the waveforms of the print data signal (DATA) will not be distorted by the crosstalk noise.

Second Embodiment

Figure 6:
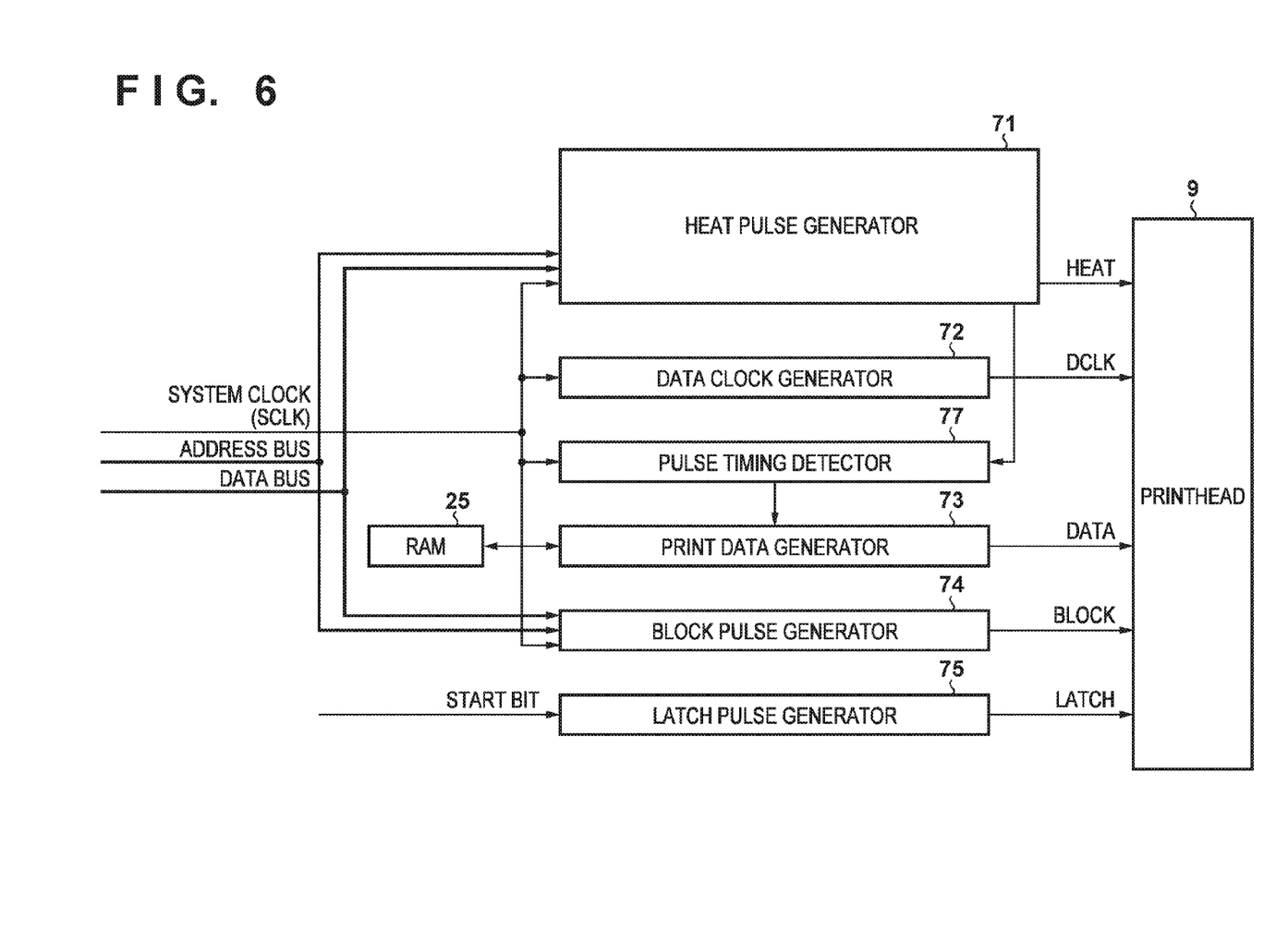
FIG. 6 is a block diagram showing the arrangement of a printhead control circuit according to the second embodiment of the present invention.

FIG. 6 is a block diagram showing the arrangement of a printhead control circuit 29 according to the second embodiment.

Note that, in FIG. 6, components and signals already described with reference to FIG. 8 are mentioned using the same reference numerals and the same symbols, and a description thereof will be omitted. Only features unique to the second embodiment will be explained.

In addition, in the following description, descriptions of arrangements already explained in the first embodiment will be omitted and only the generation of a heat pulse (HEAT) unique to the second embodiment and a generation method of a print data signal (DATA) will be described.

Pulse setting information from a CPU 21 is supplied to a heat pulse generator 71 via a data bus and an address bus. In the heat pulse generator 71, each width of the heat pulse (HEAT) is adjusted by PWM control so that constant energy is applied to electrothermal transducers (heaters). Pulse width information of the heat pulse (HEAT) from the heat pulse generator 71 is transferred to a pulse timing detector 77 and the timings of the leading edges and the trailing edges of the heat pulse (HEAT) are detected. The detected timing information is transferred to a print data generator 73.

The print data generator 73 transfers the print data signal (DATA) to printheads 9 in accordance with the transferred timing information so that the generation range of the print data signal does not overlap with the leading edge and the trailing edge of the heat pulse (HEAT). Note that in a case where it cannot be so controlled as to prevent the leading edges and the trailing edges of the heat pulse (HEAT) and the print data signal from overlapping only by adjustment of the timing, the print data signal can be divided or compressed.

In other words, in the second embodiment, the generation range of the print data signal is determined by using each width of the heat pulse as a reference.

Figure 7:
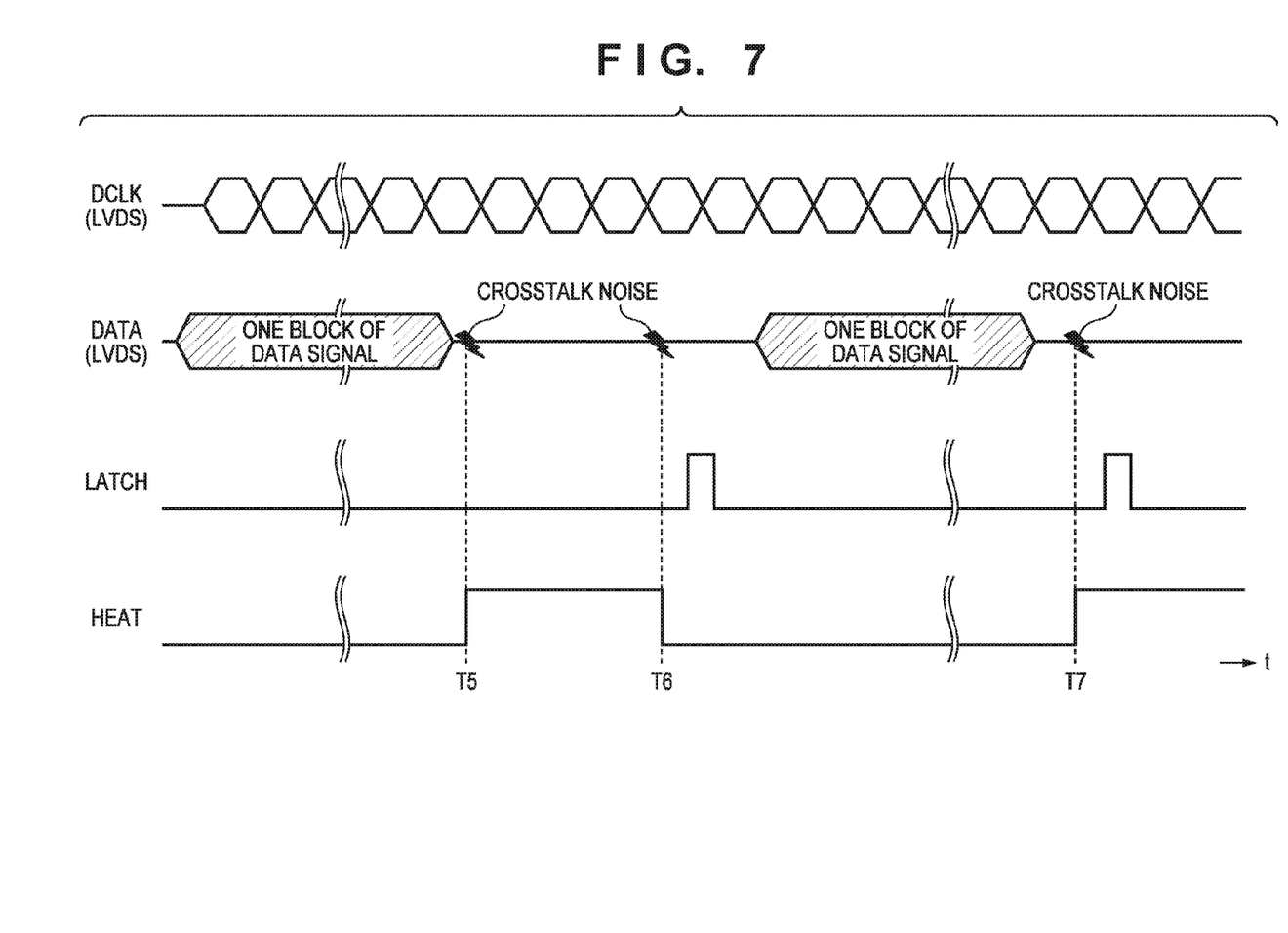
FIG. 7 is a timing chart of each signal of the printhead control circuit shown in FIG. 6.

FIG. 7 is a timing chart showing each signal of the printhead control circuit 29 according to the second embodiment. The signals shown in FIG. 7 are the same as those described in FIG. 5, and a description thereof will be omitted. In the second embodiment, as shown in FIG. 7, signal transfer control is performed so that the timings of the leading edge and the trailing edge of the heat pulse (HEAT) will not overlap the range of the print data signal (DATA).

Hence, even if crosstalk noise occurring at timings (t=T5, T6, T7) of the leading edges and the trailing edges of the heat pulse is superimposed on the signal line of print data signal, there is no print data signal at these timings. Accordingly, the waveforms of the print data signal will not be distorted by the crosstalk noise.

Although the LVDS method was used to transfer a data clock signal DCLK and the print data signal (DATA) in the first and second embodiments, the transfer of these signals is not limited to serial communication but can be based on parallel communication. In addition, although a block pulse (BLOCK) is not described in this example, the block pulse (BLOCK) can be transferred in the same manner by serial communication or parallel communication. The print data signal (DATA) in FIGS. 5 and 7 can have an arrangement including a signal related to print data, for example, an error detection code such as a CRC (Cyclic Redundancy Check).

Note that in the first embodiment, as shown in FIG. 5, since the width of the heat pulse (HEAT) tends to be large in a case where the signal width of the print data signal of one block of printing operation is large, it can be assumed that supplying energy in a short period of time will be difficult and the ink discharge will be unstable. Accordingly, the first embodiment has an arrangement which is effective in avoiding crosstalk without having to perform complicated processes such as data compression and data division in a case where the signal width of one block of print data signal (DATA) is comparatively small. In contrast, the second embodiment is advantageous in that crosstalk can be avoided regardless of the magnitude of the signal width of print data signal (DATA) of one block of printing operation.

In either case, according to the above-described first and second embodiments, signal generation control can be performed so that the leading edges and the trailing edges of the heat pulse (HEAT) and the print data signal (DATA) do not match. This prevents the waveforms of the print data signal (DATA) from being distorted by the mixing of crosstalk noise due to the heat pulse (HEAT), and as a result, the print data signal (DATA) can be sampled reliably. Accordingly, the influence of crosstalk noise on the print data signal (DATA) is avoided and high quality printing can be performed.

Note that although the droplets to be discharged from the printheads in the above-described embodiments are inks and the liquids to be contained in the ink tank were described as inks, the present invention is not limited to ink. For example, liquid such as processed liquid to be discharged to a print medium to increase the fixing properties or water repellency can be discharged from the printhead and contained in the ink tank.

Furthermore, although the printing apparatus used in the above-described embodiments is a single function apparatus, the present invention is not limited to this. For example, a multi-function printer (MFP) including a scanner function, a copy function, a facsimile function, and the like can be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087071, filed Apr. 21, 2015, which is hereby incorporated by reference herein in its entirety.

What is claimed is:

1. A printing apparatus that prints on a print medium by using a printhead including a plurality of print elements, comprising:
   an input unit configured to input print data;
   a first generation unit configured to generate a driving pulse to cause the plurality of print elements to perform a printing operation;
   a second generation unit configured to generate a print data signal based on the print data input by the input unit to cause the printhead to print on the print medium;
   a control unit configured to control a signal generation timing in one of the first generation unit and the second generation unit so as to determine, based on a driving pulse width, a generation range of the print data signal so as not to overlap with a leading edge and a trailing edge of the driving pulse or determine, based on the generation range of the print data signal, the driving pulse width so that the leading edge and the trailing edge of the driving pulse do not overlap with the generation range of the print data signal; and
   a print unit configured to transfer the driving pulse generated by the first generation unit and the print data signal generated by the second generation unit to the printhead and drive the printhead to print on the print medium.

2. The apparatus according to claim 1, wherein the control unit includes:
   a detection unit configured to detect, based on the print data input by the input unit, a print data signal width corresponding to one block of a printing operation to time-divisionally drive the printhead and a generation timing of a print data signal necessary for the one block of the printing operation; and
   a transfer unit configured to transfer the print data signal width and generation timing detected by the detection unit to the first generation unit, and
   the first generation unit generates, based on the print data signal width and generation timing transferred by the transfer unit, a driving pulse having a wider pulse width than the print data signal width.

3. The apparatus according to claim 2, further comprising a measurement unit configured to measure an internal temperature of the printhead,
wherein the first generation unit determines a driving pulse voltage in accordance with the internal temperature of the printhead measured by the measurement unit.

4. The apparatus according to claim 1, wherein the control unit includes:
a detection unit configured to detect timings of the leading edge and the trailing edge of the driving pulse generated by the first generation unit; and
a transfer unit configured to transfer, to the second generation unit, timing information of the leading edge and the trailing edge of the driving pulse detected by the detection unit, and
the second generation unit generates, based on the timing information transferred by the transfer unit, the print data signal at timings which do not overlap with the leading edge and the trailing edge of the driving pulse.

5. The apparatus according to claim 4, further comprising a measurement unit configured to measure an internal temperature of the printhead,
wherein the first generation unit determines a driving pulse voltage in accordance with the internal temperature of the printhead measured by the measurement unit.

6. The apparatus according to claim 1, wherein the print data signal is transferred to the printhead by using an LVDS (Low Voltage Differential Signaling) method.

7. The apparatus according to claim 1, wherein the print data signal is transferred to the printhead by serial communication.

8. The apparatus according to claim 1, wherein the printhead is an inkjet printhead that performs printing by discharging ink.

9. The apparatus according to claim 8, wherein the inkjet printhead includes an electrothermal transducer to generate energy applied to the ink for ink discharge.

10. The apparatus according to claim 8, wherein printing characteristics of the inkjet printhead change by an internal temperature of the printhead.

11. A print control method of a printing apparatus that prints on a print medium by using a printhead including a plurality of print elements, comprising:
inputting print data;
generating a driving pulse to cause the plurality of print elements to perform a printing operation;
generating a print data signal based on the input print data to cause the printhead to print on the print medium;
controlling one of a generation timing of the driving pulse and a generation timing of the print data signal so as to determine, based on a driving pulse width, a generation range of the print data signal so as not to overlap with a leading edge and a trailing edge of the driving pulse or determine, based on the generation range of the print data signal, the driving pulse width so that the leading edge and the trailing edge of the driving pulse do not overlap with the generation range of the print data signal; and
transferring the generated driving pulse and the generated print data signal to the printhead and driving the printhead to print on the print medium.

12. The method according to claim 11, wherein in the controlling, based on the input print data, a print data signal width corresponding to one block of a printing operation to time-divisionally drive the printhead and a generation timing of a print data signal necessary for the one block of the printing operation are detected, and the detected print data signal width and generation timing are transferred to a circuit that generates the driving pulse, and
in the circuit, based on the transferred print data signal width and generation timing, a driving pulse having a wider pulse width than the print data signal width is generated.

13. The method according to claim 12, further comprising measuring an internal temperature of the printhead,
wherein a driving pulse voltage is determined in accordance with the measured internal temperature of the printhead.

14. The method according to claim 11, wherein in the controlling, timings of the leading edge and the trailing edge of the generated driving pulse are detected, and timing information of the leading edge and the trailing edge of the detected driving pulse is transferred to a circuit that generates the print data signal, and
in the circuit, based on the transferred timing information, the print data signal is generated at timings which do not overlap with the leading edge and the trailing edge of the driving pulse.

15. The method according to claim 14, further comprising measuring an internal temperature of the printhead,
wherein a driving pulse voltage is determined in accordance with the measured internal temperature of the printhead.

16. The method according to claim 11, wherein the print data signal is transferred to the printhead by using an LVDS method.

17. The method according to claim 11, wherein the print data signal is transferred to the printhead by serial communication.

18. The method according to claim 11, wherein the printhead is an inkjet printhead that performs printing by discharging ink.

19. The method according to claim 18, wherein the inkjet printhead includes an electrothermal transducer to generate energy applied to the ink for ink discharge.

20. The method according to claim 18, wherein printing characteristics of the inkjet printhead change by an internal temperature of the printhead.

* * * * *